United States Patent [19]

Bianchi et al.

[11] 4,153,013
[45] May 8, 1979

[54] METHOD AND APPARATUS FOR CONTROLLING THE OPERATION OF AN INTERNAL COMBUSTION ENGINE

[75] Inventors: Valerio Bianchi, Hochdorf;
Reinhard Latsch, Vaihingen,
both of Fed. Rep. of Germany

[73] Assignee: Robert Bosch GmbH, Stuttgart, Fed. Rep. of Germany

[21] Appl. No.: 814,611

[22] Filed: Jul. 11, 1977

Related U.S. Application Data

[63] Continuation of Ser. No. 597,404, Jul. 18, 1975, abandoned, which is a continuation-in-part of Ser. No. 564,073, Apr. 1, 1975, abandoned.

[30] Foreign Application Priority Data

Jul. 19, 1974 [DE] Fed. Rep. of Germany ....... 2434743
Apr. 9, 1974 [DE] Fed. Rep. of Germany ....... 2417187

[51] Int. Cl.$^2$ ............................................. F02B 3/00
[52] U.S. Cl. ......................... 123/32 EA; 123/119 EC
[58] Field of Search .......... 123/32 EA, 119 A, 117 R; 73/517 A, 70.1, 117.3

[56] References Cited

U.S. PATENT DOCUMENTS

| 2,655,036 | 10/1953 | Chapman | 73/70.1 |
| 3,583,225 | 6/1971 | Wing | 73/517 |
| 3,789,816 | 2/1974 | Taplin | 123/32 EA |
| 3,872,846 | 3/1975 | Taplin | 123/32 EA |

*Primary Examiner*—Ronald B. Cox
*Attorney, Agent, or Firm*—Edwin E. Greigg

[57] ABSTRACT

The composition of the combustible mixture supplied to an internal combustion engine is controlled in dependence on the fluctuations in cylinder pressure which are monitored by sensing the fluctuations in the rotation of the engine crankshaft. These fluctuations are measured by comparison with a signal which simulates an engine running uniformly at the basic engine r.p.m. The signal which characterizes the r.p.m. fluctuations is compared with a nominal or command value and the resulting signal is used to control the mixture composition so as to maintain the fluctuations within predetermined limits.

13 Claims, 3 Drawing Figures

METHOD AND APPARATUS FOR CONTROLLING THE OPERATION OF AN INTERNAL COMBUSTION ENGINE

This is a continuation of application Ser. No. 597,404, filed July 18, 1975 now abandoned which in turn is a CIP application of application Ser. No. 564,073 filed Apr. 1, 1975, and now abandoned.

BACKGROUND OF THE INVENTION

The invention relates to a method for controlling the operation of an internal combustion engine within a predetermined operational domain. The method provides that the fuel-air ratio of the mixture supplied to the internal combustion engine and/or the quantity of recycled exhaust gas in the internal combustion engine is altered in dependence on the magnitude of the dispersion or scattering of the values of the cyclic variations in the average combustion chamber pressure as measured during time intervals which are in synchronism with the engine r.p.m.

Due to the increasingly rigorous regulations concerning exhaust gas composition and in view of the general fuel shortage, there is a need for methods and means for operating internal combustion engines in a domain wherein the toxic components of the exhaust gas can be reduced to a minimum and/or in which a minimum amount of fuel is used.

The most obvious solution to meet such requirements is to operate the internal combustion engine with as lean a fuel-air mixture as possible, i.e., to operate the engine along the so-called lean running limit of the engine. In this operational domain, one may assume that the exhaust gas is relatively free from toxic components and that the fuel consumption will be relatively low. One of the possible parameters which characterizes the lean running limit appears to be the pressure in the cylinders of an internal combustion engine. When using this solution, the fuel-air mixture which is delivered to the internal combustion engine can be influenced by either enriching it with fuel or by making it leaner in dependence on the pressures as measured in the cylinders.

However, when this problem is considered more carefully, it is found that the pressure in the cylinders of the internal combustion engine is subject to considerable fluctuations which derive partly from uncontrollable operational conditions of the internal combustion engine, for example fluctuations of the air number of the charge, and turbulence. When the pressure in the combustion chamber is determined from measurements of the angular speed of the crankshaft, there are additional error-producing influences, caused, for example, by the oscillating masses of the drive means for the crankshaft, an unevenness of the road on which the vehicle travels or by some other forces acting on the engine block of the internal combustion engine.

These fluctuations are superimposed on the normal pressure curve in a cylinder of the internal combustion engine and they result in fluctuations of the angular velocity of the crankshaft. These superimposed oscillations might be removed by the use of low-pass filters, but the use of such filters invites considerable problems because the internal combustion engine is to be operated in a wide r.p.m domain and it is very difficult to find filters which are equally suitable at both low and high r.p.m.'s (frequencies).

OBJECT AND SUMMARY OF THE INVENTION

It is a first principal object of the invention to provide a process for regulating an internal combustion engine within a predetermined operational domain while preventing the above-cited difficulties or disadvantages.

This object is achieved, according to the invention, by generating an electrical signal characteristic of the actual, non-uniformly running engine and also to generate a corresponding electrical signal which represents an ideal, uniformly running engine and by comparing these two electrical signals with one another. Any differences of phase of one signal with respect to the other are detected and the changes in the relative phase angle are used as the controlled variable in a control loop for changing the fuel-air mixture of the engine or the exhaust gas recycling rate. The change of the relative phase angle is used as a measure of the fluctuations in the average cylinder pressure during the working cycles of the internal combustion engine.

It is a further principal object of the invention to provide an apparatus for carrying out the above-described method which permits a simple and reliable regulation of the engine. It is a particular object to provide an apparatus which operates reliably even when the motor vehicle is subjected to extreme demands. If measuring sensors are already present within the motor vehicle, they are to be used in the regulation process. It is yet another object of the invention to provide an apparatus which is relatively inexpensive.

These and other objects are obtained according to the invention by providing a pulse generator, actuated by the crankshaft of the engine, and a phase comparison circuit. A second input of the phase comparison circuit receives an electrical signal that is characteristic of an idealized system rotating synchronously at the basic r.p.m. of the engine but in a uniform manner.

Further objects and advantages of the invention will become apparent from the ensuring detailed specification of a preferred exemplary embodiment taken in conjunction with the drawing.

DESCRIPTION OF THE PREFERRED EMBODIMENT

The following description relates to methods and apparatus by means of which an internal combustion engine may be operated, at least part of the time, in the operational domain adjacent to its lean running limit. The so-called lean-running limit defines an operational domain in which there is a first occurrence of a retarded combustion process. (Complete combustion failure, i.e., a missing engine, occurs only when the mixture is considerably leaner than it is in this domain, namely when the air number $\lambda$ is 5% to 10% larger.) Within an operational domain so defined, the fuel consumption is, in general, substantially lower than within an operational domain of the engine in which its fuel-air mixture is stoichiometric, i.e., where the air number obeys $\lambda = 1$. In general, when the fuel-air mixture delivered to the internal combustion engine is leaned out, the turnover of the gases in the combustion chamber is slowed and the combustion of the fuel-air mixture is displaced from the region of the top dead center of the piston toward and into the expansion stroke of the piston. The cyclic fluctuations of the combustion process and, hence, those of the torque, also increase, and if the load factor is nearly constant, the normally relatively regular fluctuations of the angular speed of the crankshaft become increasingly irregular.

Figure 1:
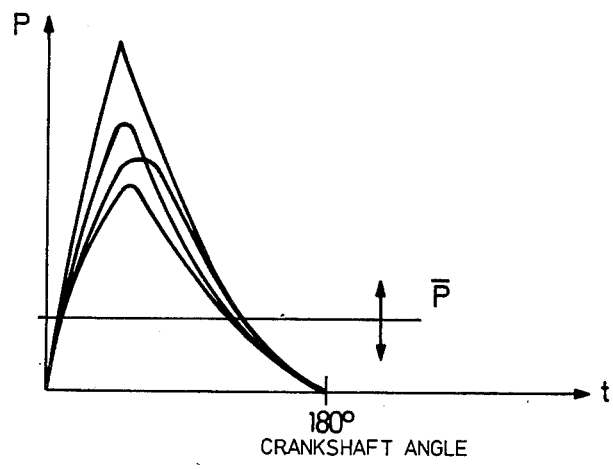
FIG. 1 is a diagram in which the pressure in a cylinder of the internal combustion engine is shown as a function of time.
Figure 2:
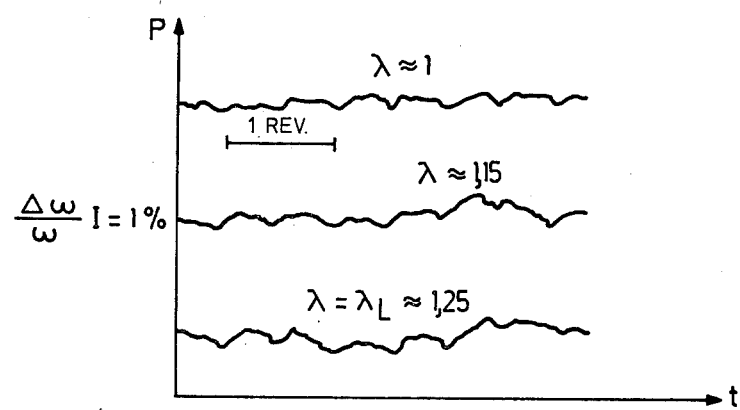
FIG. 2 is a diagram depicting the changes in the angular speed as a function of the composition of the fuel-air mixture.

Turning now to the drawings, FIG. 1 is a diagram of the pressure in a cylinder of an internal combustion engine as a function of time. It may be seen that the pressure first increases, then attains a maximum and subsequently drops abruptly. This pressure is subject to a great deal of scattering which has an effect on the angular speed of the crankshaft of the engine. The curves show that a continuous measurement of the combustion chamber pressure would not be useful for a stable control of the fuel-air mixture and hence of the operational behavior of an internal combustion engine. However, if attention is confined to the pressure within an angular crankshaft region between 0° and 180°, and if the instantaneous values of the pressures are integrated, one obtains an average combustion chamber pressure which also varies in dependence on the composition of the fuel-air mixture. It is an object of this invention to exploit the dispersion or the scattering of the cyclic variations of this average combustion chamber pressure within predetermined time intervals in controlling the operational behavior of the internal combustion engine. Naturally, the most precise method for measuring the average combustion chamber pressure is to dispose a pressure sensor within the combustion chamber, but such measurements are extremely expensive. It is simpler, therefore, to monitor the variations of the torque at the crankshaft of the engine. It is still simpler to determine the changes in the angular speed of the engine or the changes in the time taken by the crankshaft to rotate through the angular distance between two predetermined angles. The conditions described above will now be elucidated with the aid of FIG. 2, in which the normalized change of the angular crankshaft speed is shown as a function of time and for several values of the fuel-air mixture. The top curve relates to an air number $\lambda \approx 1$, i.e., a stoichiometric mixture; the middle curve is related to an air number $\lambda \approx 1.15$; and the bottom curve is for an air number $\lambda \approx 1.25$. From these curves, it may be seen that the fluctuations of the angular speed of the crankshaft increases with an increasing air number, i.e., with an increasingly lean mixture.

If the fluctuations of the angular speed are used to derive a signal characteristic of the relative angle between the actual system and a uniformly rotating comparison system, then this signal may serve as a controlled variable. The relative phase angle is permitted to vary between fixedly prescribed values at which the internal combustion engine runs with a fuel-air mixture which still has the desired characteristics, i.e., the desired air number $\lambda$. The difference angle is formed by measuring the transition time of markers located on the circumference of the crankshaft. The comparison value or the comparison marker is formed by electronic simulation of a system which runs synchronously at the basic r.p.m. of the crankshaft of the engine but without exhibiting cyclic fluctuations and which represents, in effect, a uniformly rotating engine. In this manner, the angle between the marker attached to the crankshaft and the electronically simulated marker may be determined.

Figure 3:
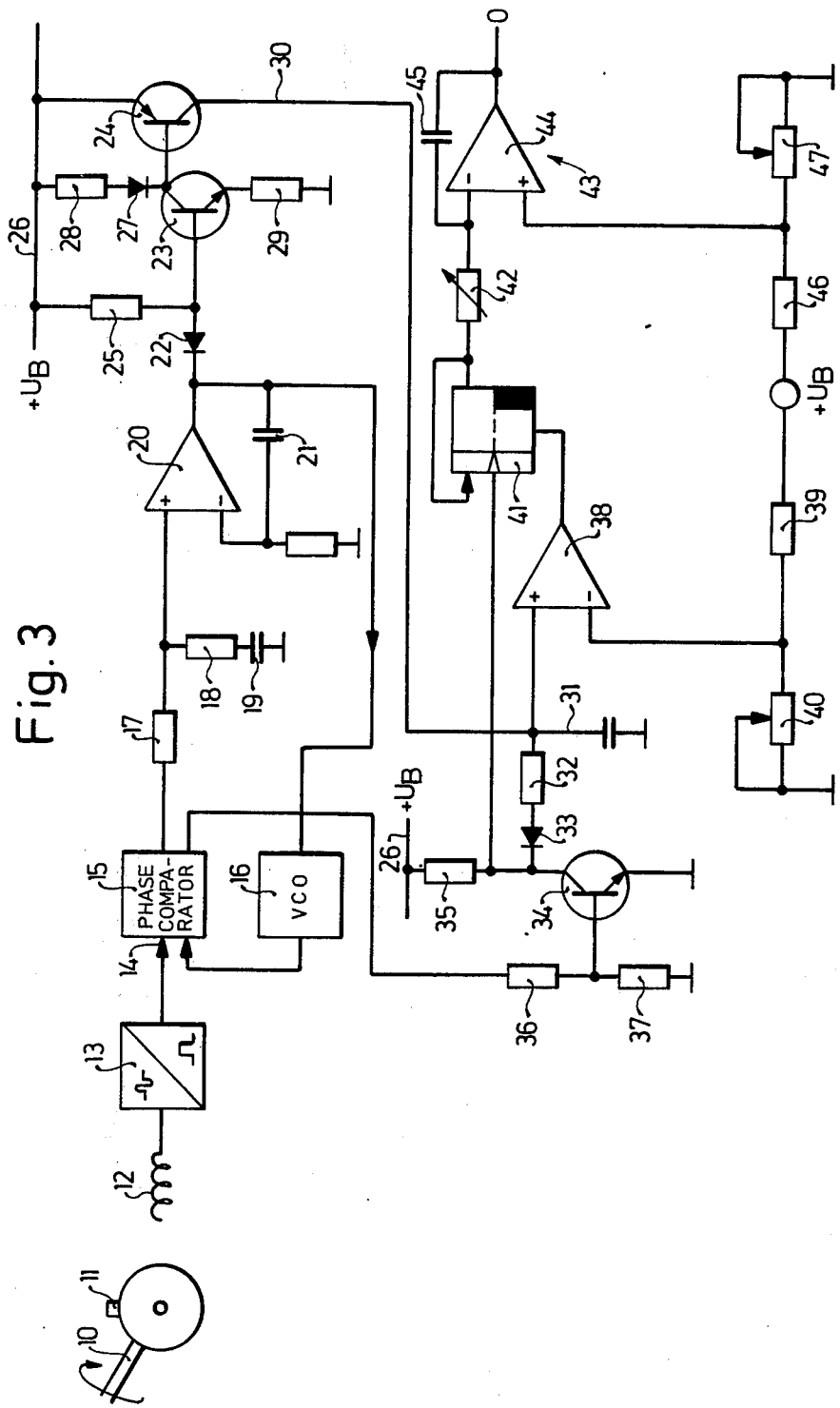
FIG. 3 is a circuit diagram of an apparatus for generating an electrical signal for changing the composition of the fuel-air mixture in dependence of the phase angle between the crankshaft and an electrical comparator system, wherein the phase angle is measured after each or after several operating cycles of the engine.

FIG. 3 is a diagram of a system for providing control signals which may be used to control the composition of the fuel-air mixture. An internal combustion engine, not shown, has a crankshaft 10 on which there is affixed a marker or indicator 11. This marker travels past an inductive transducer 12 in which a signal is induced whenever the marker 11 passes directly opposite the transducer 12. The transducer 12 is connected to a pulse shaping circuit 13 which forms a sequence of rectangular pulses. Thus, the output of the pulse shaper 13 is a sequence of pulses whose frequency is determined by the transducer/pulse generator assembly 11, 12. This sequence of pulses is fed to a first input 14 of a phase comparator circuit 15. The output from a voltage-controlled oscillator 16 is connected to the second input of the phase comparator circuit 15. A second output of the phase comparator circuit is connected through a resistor 17 and a resistor 18 with an integrating capacitor 19, henceforth called a first integrator. The resistor 17 is also connected to the non-inverting input of an operational amplifier 20 whose feedback branch contains a capacitor 21 connected between its output and its inverting input and which acts as a second integrator. The output signal from the second integrator circuit 20,21 is fed to the input of the voltage-controlled oscillator 16 and controls the output frequency of this oscillator in dependence on the output signal of the operational amplifier 20.

The circuit comprising the first integrator 19, the second integrator 20,21, and the voltage-controlled oscillator generates a signal which simulates a uniformly rotating internal combustion engine. Thus, when the two signals fed to the two inputs of the phase comparator circuit 15 have the same phase, no signal appears at the second output of the phase comparator circuit 15. In such a case, the actual engine and a simulated engine are considered to be rotating synchronously and uniformly. On the other hand, if the fluctuation of the average pressure in the combustion chamber causes a change in the transition time of the marker 11, then the second output of the phase comparator circuit 15 carries a signal which is a measure of the change in the period of rotation. The first output of the phase comparator circuit carries a signal which corresponds to a frequency change, namely the change in the period of rotation compared to the nominal period. The signal is positive when the phase error is positive and it is negative when the phase error is negative.

The output of the first integrator 19 is a voltage which corresponds to the angular acceleration. If this voltage is integrated once more, the signal at the output of the operational amplifier 20 corresponds to an r.p.m., namely the r.p.m. of the uniformly rotating system. This r.p.m. signal is fed through a diode 22 to a first amplifying transistor 23 whose output electrode is connected to the control electrode of a second amplifying transistor 24. The control electrode of the first amplifying transistor is also connected, through a resistor 25, to a common positive supply line 26. A diode 27 is connected in series with a resistor 28 between the collector of the first amplifying transistor 23 and the common positive supply line 26. The emitter of the first transistor 23 is connected through a resistor 29 to the common ground. The last described circuit functions as follows: Depending on the magnitude of the r.p.m. signal, the first amplifying transistor 23 is made more or less conducting. For example, if the r.p.m. is high, the voltage at the output of the operational amplifier 20 is large and positive. This positive voltage increases the current through the collector-emitter path of the amplifying transistor 23, so that the voltage at the collector of the first amplifying transistor 23 becomes more negative. This negative potential increases the current flow over the emitter-collector path of the subsequent second amplifying transistor 24 so that the line 30 carries a current whose magnitude is proportional to the r.p.m. "n".

The collector of the second amplifying transistor 24 is connected to a capacitor 31. This capacitor is also connected through a resistor 32 and a diode 33 to the switching path of a semiconductor switch 34, whose emitter is connected to ground and whose collector is connected to the positive supply line 26 through a resistor 35. The control electrode of the semiconductor switch 34 is connected to the tap of a voltage divider consisting of series resistors 36 and 37 which, in turn, are connected between the first output of the phase comparator circuit 15 and ground. The capacitor 31 is also connected to the non-inverting input of an operational amplifier 38 which compares the actual value with the nominal, or command value fed to the inverting input of the operational amplifier 38. This command value is formed with the aid of a voltage divider consisting of resistors 39 and 40. The resistor 40 is embodied as a variable resistor so that corrections in the command value are made possible, for example in dependence on the engine temperature, the outside air pressure and other operational engine parameters.

The last described circuit functions as follows: When the signal at the second output of the phase comparator circuit 15 is positive, the switching transistor 34 is blocked and the capacitor 31 is being charged by the amplifying transistor 24. Since the charging current flowing through the amplifying transistor 24 is proportional to the r.p.m., and since the capacitor 31 can be charged only when a difference in the transition time is signaled at the second output of the phase comparator circuit, the charge taken up by the capacitor and hence the voltage across this capacitor is proportional to the product of the transition time difference and the r.p.m. This product is exactly equal to the angular difference between the two rotating systems. The corresponding electrical signal is compared with the command value and the resulting output signal is fed to a bistable multivibrator 41. As has been indicated above, the capacitor 31 is charged only whenever the transistor 34 is blocked and it is discharged when the transistor 34 conducts. In the latter case, the switching path of the conducting switching transistor 34 is connected in parallel to the capacitor 31 via the resistor 32 and the diode 33. When another signal arrives from the second output of the phase comparator circuit 15, the transistor 34 again blocks, and the above-described cycle is repeated.

The final control element connected behind the operational amplifier 38 includes the bistable multivibrator 41. The clock input of the bistable multivibrator 41 is connected to the collector of the semiconductor switch 34. The output of the bistable multivibrator 41 is connected to its own input and also, through an adjustable resistor 42, to an integral controller 43 which is embodied as an operational amplifier 44. An integrating capacitor 45 is connected between its output and its inverting input. A reference voltage, taken from the tap of a voltage divider consisting of resistors 46 and 47 is fed to the non-inverting input of the operational amplifier 44.

The last described circuit functions as follows: The comparator 38 compares the actual and the command value and delivers at its output short pulses whenever the actual value is greater than the command value. In the opposite case, i.e., when the actual value is smaller than the command value, the output of the comparator 38 carries no signal. The output of the comparator 38 is fed to the set input of the bistable multivibrator 41; thus, whenever pulses occur at the output of the comparator 38, the multivibrator 41 is switched into a condition in which a logical "1" occurs at its output. On the other hand, when signals are present at the collector of the switching transistor 34, the multivibrator 41 is switched into a condition in which its output carries a logical "0".

Thus, whenever the actual value is smaller than the command value, a constant logical "0" occurs at the output of the operational amplifier 38. This means that the set input of the bistable multivibrator 41 is without signal. Hence its own output is a logical "0" and the integrator 43 integrates in the positive direction, i.e., the output voltage of the operational amplifier 44 increases and this output voltage is used, in a manner not shown, to increase the actual value towards the command value.

If, on the other hand, the actual value is greater than the command value, a sequence of pulses occurs at the output of the comparator 38. These pulses switch the bistable multivibrator 41 into a condition in which its output carries a logical "0". However, due to the pulses fed to the set input of the multivibrator 41 the latter is switched over, so that its output is a logical "1" and this signal causes the output voltage of the operational amplifier 43 to change toward zero. The clock pulse taken from the collector of the switching transistor 34 switches the multivibrator 41 back to the state in which its output again is a logical "0".

The output signal from the operational amplifier 44 may be used, for example, in a conventional manner, to engage the controller of an electronically controlled fuel injection system so as to obtain a prolongation or a shortening of the fuel injection control pulses and, thus, to alter the composition of the fuel-air mixture. It is also possible to use the output signal of the operational amplifier 44 to control an exhaust gas recycling valve so as to influence the operational characteristics of an internal combustion engine.

What is claimed is:

1. A method for controlling the operation of an internal combustion engine, comprising the steps of:
   (A) generating a first electrical signal representative of the angular position of a rotating member of the engine, said signal being generated in rpm synchronized time intervals;
   (B) generating a second electrical signal by twice integrating the first electrical signal, said second electrical signal being representative of the angular position of an object rotating uniformly at the same rpm as said rotating member of the engine;
   (C) measuring the relative phase angle between said first and said second electrical signals, said measurement of the relative phase angle corresponding to the fluctuations of the mean combustion chamber pressure; and (D) adjusting the fuel-air ratio of the fuel-air mixture admitted to the internal combustion engine in dependence on said phase angle.

2. A method for controlling the operation of an internal combustion engine, comprising the steps of:
(A) generating a first electrical signal representative of the angular position of a rotating member of the engine, said signal being generated in rpm synchronized time intervals;
(B) generating a second electrical signal by twice integrating the first electrical signal, said second electrical signal being representative of the angular position of an object rotating uniformly at the same rpm as said rotating member of the engine;
(C) measuring the relative phase angle between said first and said second electrical signals, said measurement of the relative phase angle corresponding to the fluctuations of the mean combustion chamber pressure; and
(D) adjusting the amount of exhaust gas which is recycled to the intake side of the engine in dependence on said phase angle.

3. An apparatus for controlling the operation of an internal combustion engine comprising:
(A) first signal generator means comprising an indicator operatively associated with the engine crankshaft and a pulse generator assembly, for detecting the periodic passage of the indicator relative to the pulse generator assembly, for generating a corresponding first electrical signal indicative of the engine crankshaft rotation, and for transmitting said first signal to an input of a phase comparator;
(B) second signal generator means connected to one output of the phase comparator, for generating, from said first electrical signal, a uniform periodic second electrical signal corresponding to the rotational frequency of a uniformly rotating engine crankshaft and for transmitting said second signal to an input of the phase comparator, said second signal generator means including means for performing a two-step integration of said first signal to produce said second signal; and
(C) a phase comparator, for comparing the relative phase angle between said first and second electrical signals and for generating an output signal when said signals are asynchronous, said comparison corresponding to the fluctuations of the mean combustion chamber pressure; whereby said output signal may be used to control the composition of the fuel-air combustion mixture.

4. An apparatus as defined in claim 3, wherein said first integrator is composed of passive elements and said second integrator includes an operational amplifier and a capacitor connected between its input and its output and wherein the output of said first integrator is connected to the input of said second integrator and the output of said second integrator is connected to the input of said voltage-controlled oscillator.

5. An apparatus as defined in claim 3, wherein the signal fed to said voltage-controlled oscillator is substantially equal to the sum of the output signals from said first and from said second integrators.

6. An apparatus as defined in claim 3, further comprising:
(D) a controlled current source which delivers a current which is proportional to the output signal of said second integrator.

7. An apparatus as defined in claim 6, further comprising:
(E) a semiconductor switch whose control electrode is connected to an output terminal of said phase comparator; and
(F) a capacitor, connected to said semiconductor switch; whereby said semiconductor switch controls the charging rate of said capacitor.

8. An apparatus as defined in claim 7, wherein said capacitor is connected so as to be charged by said controlled current source.

9. An apparatus as defined in claim 7, further comprising:
(G) a comparator circuit with at least two inputs, one input being connected to said capacitor and the other input being provided with a reference voltage.

10. An apparatus as defined in claim 9, further comprising:
(H) a servo element controlled by the output of said comparator for changing the composition of the fuel-air mixture supplied to the engine.

11. An apparatus as defined in claim 10, wherein said servo element has integral control characteristics.

12. An apparatus as defined in claim 10, wherein the composition of the fuel-air mixture is changed by altering the amount of exhaust gas returned to the intake of the engine.

13. An apparatus for controlling the operation of an internal combustion engine comprising:
(A) first signal generator means, for detecting the motion of a rotating member of the engine and for generating a corresponding first electrical signal, said rotating member including an indicator operatively associated with the engine crankshaft;
(B) second signal generator means, for generating a uniform periodic second electrical signal corresponding to the rotational frequency of a uniformly rotating engine member; and
(C) a phase comparator, for comparing the relative phase angle between said first and second electrical signals and for generating an output signal; whereby said output signal may be used to control the composition of the fuel-air combustion mixture, whereas said second signal generator means includes:
(i) first and second integrators, connected in series to an output connection of said phase comparator; and
(ii) a voltage-controlled oscillator connected in series with said first and second integrators, the output terminal of said voltage-controlled oscillator being connected to an input connection of said phase comparator.

* * * * *